June 15, 1926.
A. T. GOLLNIK
1,589,145
SUPPORT FOR COMMERCIAL ARTICLES
Filed Nov. 1, 1924 2 Sheets-Sheet 1
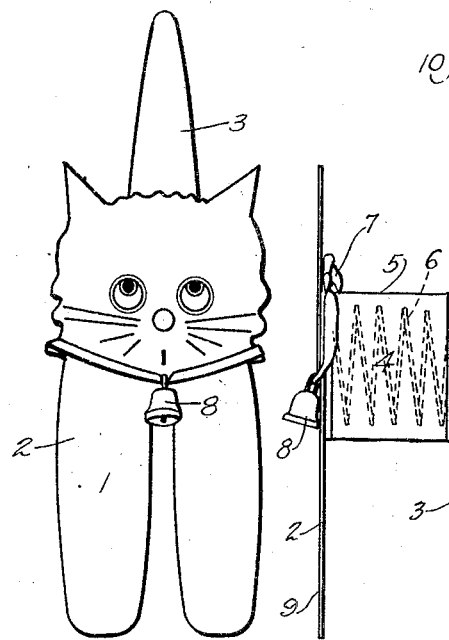
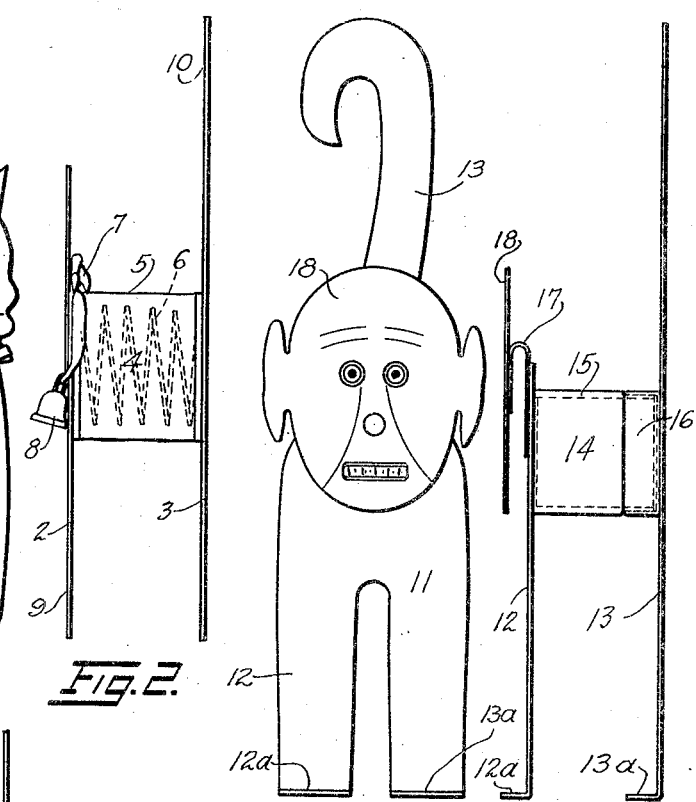
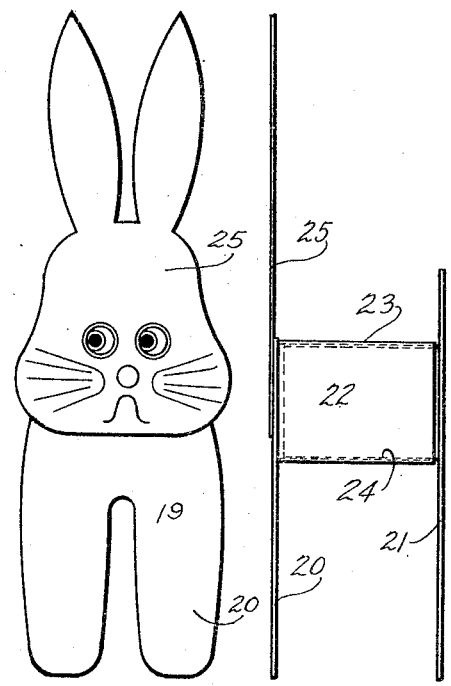
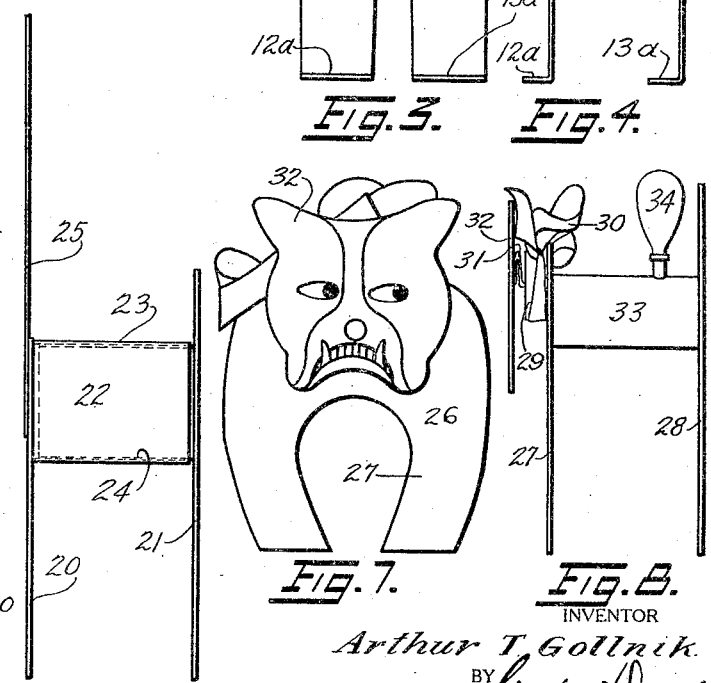
INVENTOR
Arthur T. Gollnik.
BY
Gustav Drews
ATTORNEY June 15, 1926.
A. T. GOLLNIK
1,589,145
SUPPORT FOR COMMERCIAL ARTICLES
Filed Nov. 1, 1924    2 Sheets-Sheet 2
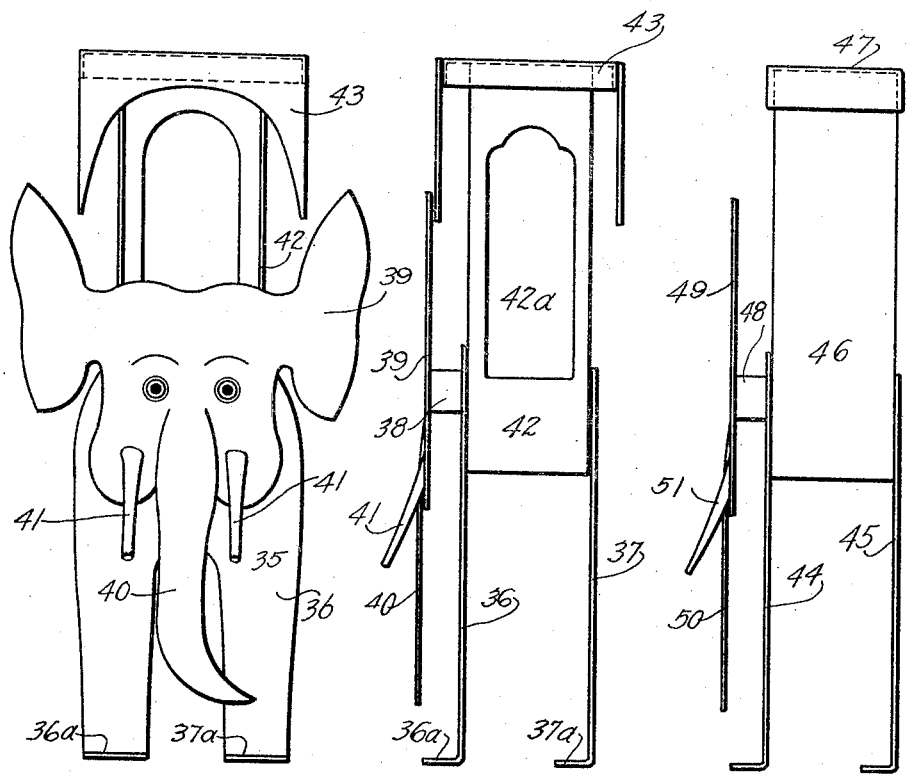
INVENTOR
Arthur T. Gollnik.
BY
Gustav Drews
ATTORNEY Patented June 15, 1926.

1,589,145

UNITED STATES PATENT OFFICE.

ARTHUR T. GOLLNIK, OF NEW YORK, N. Y., ASSIGNOR OF ONE-HALF TO EDITH P. WOOD, OF NEW YORK, N. Y.

SUPPORT FOR COMMERCIAL ARTICLES.

Application filed November 1, 1924. Serial No. 747,224.

This invention relates to novel improvements in toys having artistic decorative effects and having the purpose of forming a housing for articles or for musical devices.

At the present time in the manufacture of decorative toys in the class in which this invention resides, the animals or characters depicted are painted on a single surface which surface is fastened to or connected with the main body portion. However the form or configuration has not up to the present time been combined with a housing or receptacle whereby the receptacle shall form the body of the animal wherein the fore and rear parts of this animal are attached to the receptacle so as to give the toy a definite life-like contour.

This invention is not limited merely to one type of animal form nor to one type of housing, it being considered within the scope of the invention to provide various animate or character forms of definite type, configuration and coloration, such for instance, as a child or adult in crawling position, or an adult in standing position while the housing may be such as will have therein a space to serve as a receptacle for delicacies such as candies, fruits, nuts, or on the other hand may serve as a receptacle for containing a sound producing means actuated independent of or by the motion of the device.

Among the objects of the invention it is contemplated to provide a decorative toy of the configuration of animals or the like, the toy being formed of a plurality of parts indicating relative sections such as foremost and hindermost parts of a character, the two parts of which are connected by a housing to provide novel decorative effects of the animal or character so as to give a novel and distinctive and yet pleasing appearance to the eye; to provide various forms of housings adapted to contain delicacies; to provide novel means of forming and connecting the sections of the animal or character form with the housing; to provide the animal parts in a plurality of sections so as to produce novel results; to provide means within the housing cooperating with the configuration of the animals supporting the same for causing a musical sound when the toy is actuated; to provide means for introducing grotesque configurations in toy structures; and lastly it is aimed to provide a novel article serviceable for display of delicacies or as a source of musical sounds which while maintaining a pleasing form, the article by its structure is cheap in cost of manufacture and novel in configuration.

Specifically it is aimed to provide supports for a housing which contains delicacies or musical sources which supports are designated as sections of animal forms wherein the housing forms the main body portion.

Further it is aimed to provide novel color schemes of the supports so as to coincide with the natural color of the animal represented.

Still further it is aimed to provide the housing in a plurality of sections each of which is connected to or attachable with one of the supports forming the animal designated and which is assembled to form a container and the body portion of the animal by the transposition of one of the sections of each of the supports upon the other.

Still further it is aimed to provide novel means within the housing for causing musical sounds either by motion of the respective parts of the device or by the action of a part external to the housing.

Still further it is aimed to provide novel means for arranging the sections of the animals depicted with regard to the supports so as to give an appearance of depth and solidity to the device.

Still further it is aimed to provide novel means of connecting portions of the supports such as the heads so as to give a grotesque appearance of the animal or character depicted.

Still further it is aimed to provide cardboard sections, either hand painted or color printed to form the supports and head portions of the device.

Still further it is contemplated to provide novel means of arranging the housing so as to support delicacies therein or containers for delicacies in either the horizontal or vertical plane.

Still further it is contemplated to provide the housing with decorative effects so as to cooperate with the supports in depicting the animal or character whereby to associate the housing directly with the animal.

These and other features, advantages and capabilities of the invention will appear from the subjoined detail description of the invention illustrated in the accompanying drawings, in which—

Figure 1 is a front elevation of one of the devices;

Fig. 2 is a side elevation of the device shown in Fig. 1;

Fig. 3 is a front elevation of a modification of the invention;

Fig. 4 is a side elevation of the modification shown in Fig. 3;

Fig. 5 is a front elevation of a further modification of the invention;

Fig. 6 is a side elevation of the modification shown in Fig. 5;

Fig. 7 is a front elevation of still another modification of the invention;

Fig. 8 is a side elevation of the structure shown in Fig. 7;

Fig. 9 is a front elevation of a still further modification of the invention;

Fig. 10 is a side elevation of the modification shown in Fig. 9; and

Fig. 11 is a side elevation of still a further modification of the invention shown in Fig. 10.

Referring now more particularly to the reference characters in the drawing numeral 1 represents a toy, in this case having the configuration of a cat. This toy cat as indicated clearly in Fig. 2 is composed of three main sections, the foremost portion 2 is indicated as the head and the legs of Fig. 1, and the rearmost portion 3 is indicated by the tail in Fig. 1, and the rear legs, not shown. These supports may be formed of material such as cardboard, celluloid, wood or metal, the specific material going into the formation of the said supports not being of the essence though it is contemplated to provide these supports of relatively thin configuration and light material of which pressed cardboard forms a readily applicable material.

Between the supports 2 and 3 and directly connected thereto at their extremities there is formed a housing 4. In the modification of Fig. 2 the housing 4 consists of a container 5 having in this case a musical source therein which source is actuated by the motion of the housing which in this case is made of collapsible material and held in open or spread position to form the body of the animal or character by the spring 6. To provide decorative effects there is fixed about the forward support of the animal a ribbon 7 having a bell or other trinket 8 thereon. The forward and rear supports are painted or printed to indicate the color and characteristics of the animal or character to be described, in Figs. 1 and 2, 9 indicating the forelegs of the forward support 2 of a cat, whereas 10 depicts the tail or rearward appendages of the animal extending from the rear support 3.

Though the housing in Figs. 1 and 2 is here illustrated as a collapsible housing for a musical instrument it can readily be conceived to be within the scope of the invention to provide a housing or receptacle of that form in which candies or other delicacies may be placed.

Referring more particularly to the modification of the device shown in Figs. 3 and 4 we have herein an animal or other character 11 having the supports 12 and 13 for the foremost and hindermost portions of the animal similar to those described in Figs. 1 and 2, but having bases 12$^a$ and 13$^a$ to form a firm footing for the toy. Integral with or attached to each of the respective supports 12 and 13 there are formed a plurality of hollow sections 15 and 16, which when the two supports are drawn towards one another will combine to form a housing, 14 adapted for containing candies, nuts or other delicacies, or if so desired a musical instrument. In this modification of the device as shown in Fig. 4 there is attached to the support 12 a head portion 18 by means of the flexible connection 17 pasted or riveted to the said support. In this modification of the device it can be seen that the head of the animal decorated with any coloration as desired will be relatively movable and extending outwardly from the main support so as to give a clear projection of the head portion whereby to illustrate the depth and difference in location of the head with respect to the legs indicated, by the support 12.

Though the housing 14 is shown as being formed of two sections and separable by the movement apart of the two respective supports 12 and 13, it is conceivable that the housing may be one piece fastened to each of the supports 12 and 13 and adapted to be opened at any part thereof without movement of the supports from one another.

In the modification shown in Figs. 5 and 6 the animal or character 19 here shown as a rabbit is formed of two supports 20 and 21 having hollow sections 23 and 24 integral and attached thereto respectively, which hollow portions when combined by the movement of the supports 20 and 21 towards one another will form a housing or receptacle 22 in which musical sources or delicacies such as candies or nuts may be placed. In this modification as shown in Fig. 6 the head portion 25 decorated according to the individual desire of the manufacturer is attached to the support 20 by glue, rivets or any other fastening means. The essence of the novelty in this modification lies in the separate head portion 25 which is superimposed on the support 20, and the particular length and design of the housing 22, which is formed by the two sections 23 and 24, which in this case are practically of equal length wherein the member 24 slides within the sleeve 23.

In the modifications shown in Figs. 7 and 8 there is portrayed an animal, in this case a dog, 26 having forward portions 27, rearward portions 28, and a head portion 32. In this modification there is attached to the upper portion of the support 27 a casing 29 which is covered by a decorative ribbon 30 and which has fastened thereto a spring 31. This spring 31 has fixed at its opposite end the head portion 32 of the dog whereby the head may be moved in various positions so as to give a grotesque appearance to the toy and allow the head to be movable forward at will due to its flexible connection. The housing 33 in this case is fastened directly to the two supports 27 and 28 and has therein an opening, in this case containing a musical instrument 34, though this may be adapted for the insertion of candies or other delicacies.

In the modification shown in Figs. 9, 10 and 11, there is indicated in this case an elephant 35, colored to represent the royal elephant of Siam with purple and gold trappings. In this modification, the main body portions of the same, forming the foremost and hindmost portions of the elephant 35 consist of the supports 36 and 37 to which there is attached to and fixed in any well-known manner a housing 42. This housing, shown in Fig. 10, consists of a hollow box-like receptacle having an opening 42ª therein adapted to have inserted therein a box of candy or a package of delicacies, which inserted package can readily be discerned upon inspection. However this housing 42 need not necessarily be a container for delicacies since a musical instrument or any material may be inserted therein. To cap the housing there is placed a head 43, which may or may not be removable, and which, as the case may require, be decorated with appropriate colors. To the front support 36 forming the fore legs of the animal there is attached at the uppermost portion a casing 38, to which there is fixed, flexibly or removably attached, a head 39 decorated appropriately, which head has appended thereto protruding projections such as the trunk 40 and the tusks 41. The supports 36 and 37 have in this case bases 36ª and 37ª which serve as additional supporting means for the toy.

In the modification shown in Fig. 11 the housing 46 is supported by supports 44 and 45 but consists of a unitary box-like receptacle having a cap 47 thereon which box may contain delicacies or serve to contain a musical instrument operable by the motion of the toy, or a quantiy of delicacies. As in Fig. 10 the head 49 of the animal is attached to the fore support 44 through means of the casing 48 and has thereon the decorative trunk 50 and tusks 51.

Although the devices concerning the invention are herein limited to description of a few members of the animal kingdom it is contemplated within the scope of this invention to include any and all animals, or material structures which have means whereby a front and rear portion thereof such as a house or other structure which may be designated in two parts, that is, the front and rear, and which may support therein a body portion such as a housing.

It is contemplated in this invention to differentiate from the unitary formed houses or boxes which contain candy, by specifically indicating the feature of supporting front and rear portions, graphically representing those sections of the structure whether it be a house, animal or any characteristic structure, between which supports there is insertible a housing for containing either delicacies such as candies or nuts or a musical instrument.

It is of course obvious that the decorative effects, in other words the coloring and the trappings of the various devices, are not limited to any one particular type or coloration, it being well within the scope of the invention to vary these features at will. Further it is also contemplated within the scope of this invention to provide various configurations of housings, whether there be one, two or three sections, whether the sections have sleeves interacting and interlocking with one another, or whether the housings have openings independent of the supports maintaining the housing in position. The essence of the invention consequently lies in the conception of a plurality of supporting members representing fore and rear portions of animals or any other type of device wherein forward and rearward structural configurations are provided between which a housing may be inserted.

Though each of the individual modifications herein has particular features of novelty differing from one another it is contemplated that these features may be interchangeable or incorporated all together in one structure.

It is obvious that various changes and modifications may be made to the details of construction without departing from the general spirit of the invention as set forth in the appended claims.

I claim:

1. In a device of the character described, the combination with supports defining the forward and rearward portions of a four-legged animal character in standing position, of plain telescoping housing portions, each connected to one of said supports, and telescoping into one another to form a closed container spaced from the supporting surface by the leg portions of said supports.

2. A combination figure toy and container having two supports defining the rearward and forward portions of a four-legged animal character in standing position, the rearward portion having downward extensions defining the two rear legs of the animal character in standing position and the forward portion having downward extensions defining the two front legs of the animal character in standing position, and telescopic housing portions, each connected to one of said supports above the legs thereof and telescoping into one another to form a closed container to simulate the trunk portion of the animal character.

3. A combination figure toy and container having two sheet cardboard supports defining the rearward and forward portions of a four-legged animal character in standing position, the rearward portion having lower extensions defining the rear legs of the animal character in standing position and the forward portion having lower extensions defining the front legs of the animal character in standing position, and a plain housing connected to and interposed between the respective supports for receiving material therein and supporting it spaced from the supporting surface on which the cardboard supports rest and simulating the trunk portion of the animal character, the housing consisting of two hollow cylindrical casings each projecting from, and being closed at one end by, one of said supports, and telescoping one into the other to form a closed container.

4. A combination figure toy and goods carrying device having two supports defining the rearward and forward portions of a four-legged animal character in standing position, the rearward portion having lower extensions defining the rear legs of the animal character in standing position and the forward portion having lower extensions defining the front legs of the animal character in standing position, and a goods carrying device connected to and interposed between the respective supports to simulate the trunk portion of the animal character, one end of the device being connected to one support and the other end of the device being connected to the other support spaced from the supporting surface by the leg portions of said supports.

5. In a device of the kind described, a pair of supports each having a supporting element, one of said supports representing a distinctive portion of an animate character, the other of said supports representing a distinctive portion of an animate character, and a connection extending from one support to the other and constituting a carrying device for a commercial article.

ARTHUR T. GOLLNIK.